(12) United States Patent
Minnich et al.

(10) Patent No.: US 11,585,130 B2
(45) Date of Patent: Feb. 21, 2023

(54) BIN LATCH

(71) Applicant: Southco, Inc., Concordville, PA (US)

(72) Inventors: David A. Minnich, Lincoln University, PA (US); Andrew S. Matejka, Philadelphia, PA (US)

(73) Assignee: Southco, Inc., Concordville, PA (US)

(*) Notice: Subject to any disclaimer, the term of this patent is extended or adjusted under 35 U.S.C. 154(b) by 601 days.

(21) Appl. No.: 16/342,719

(22) PCT Filed: Oct. 19, 2017

(86) PCT No.: PCT/US2017/057383
§ 371 (c)(1),
(2) Date: Apr. 17, 2019

(87) PCT Pub. No.: WO2018/075766
PCT Pub. Date: Apr. 26, 2018

(65) Prior Publication Data
US 2019/0292819 A1    Sep. 26, 2019

Related U.S. Application Data

(60) Provisional application No. 62/411,231, filed on Oct. 21, 2016.

(51) Int. Cl.
*E05C 3/16*         (2006.01)
*E05B 59/00*       (2006.01)
(Continued)

(52) U.S. Cl.
CPC .............. *E05C 3/162* (2013.01); *B64D 11/003* (2013.01); *E05B 15/0295* (2013.01);
(Continued)

(58) Field of Classification Search
CPC .......... E05B 63/14; E05B 59/00; E05B 41/00; E05B 15/0295; E05B 63/143;
(Continued)

(56) References Cited

U.S. PATENT DOCUMENTS 6,923,478 B2 *   8/2005   Geurden ................... E05C 3/24
                                                          292/28
7,004,517 B2 *   2/2006   Vitry ....................... E05B 81/14
                                                          292/216
(Continued)

FOREIGN PATENT DOCUMENTS

CN        101542064 A      9/2009
CN        102007258 A      4/2011
(Continued)

OTHER PUBLICATIONS

International Search Report and Written Opinion for International Application No. PCT/US2017/057383, dated Feb. 2, 2018—15 pages.
(Continued)

*Primary Examiner* — Kristina R Fulton
*Assistant Examiner* — Tal Saif
(74) *Attorney, Agent, or Firm* — RatnerPrestia

(57) ABSTRACT

A latch or connector system having a latch housing, a first latching component, a second latching component, and a handle. The first and second latching components are movably mounted to the latch housing, and movable respective latched and unlatched positions. The handle is movably mounted to the latch housing and operatively associated with the first latching component and the second latching component. The handle is movable from a closed handle position to an open handle position to cause the first latching component and the second latching component to move from their respective latched positions to their respective unlatched positions, and the handle is movable from the open handle position to the closed handle position only when the first latching component and the second latching component are in their respective latched positions.

14 Claims, 9 Drawing Sheets

(51) Int. Cl.
*E05B 63/14* (2006.01)
*E05B 15/02* (2006.01)
*E05B 41/00* (2006.01)
*E05C 3/28* (2006.01)
*B64D 11/00* (2006.01)

(52) U.S. Cl.
CPC .............. *E05B 41/00* (2013.01); *E05B 59/00* (2013.01); *E05B 63/14* (2013.01); *E05C 3/28* (2013.01)

(58) Field of Classification Search
CPC ......... B64D 11/003; E05C 3/162; E05C 3/28; E05C 19/002; E05C 3/045; E05C 19/10; E05C 3/22; E05C 3/24; E05C 3/30; E05C 3/34; Y10S 292/31; Y10S 292/11; Y10S 292/37; Y10S 292/63
See application file for complete search history.

(56) References Cited

U.S. PATENT DOCUMENTS

| | | | |
|---|---|---|---|
| 7,931,313 B2* | 4/2011 | Carabalona | E05C 19/16 292/45 |
| 8,439,409 B2 | 5/2013 | Uto et al. | |
| 8,474,883 B2 | 7/2013 | Konchan et al. | |
| 8,628,127 B2 | 1/2014 | Prasad | |
| 2004/0104583 A1 | 6/2004 | Porte | |
| 2004/0195841 A1* | 10/2004 | Liu | E05B 63/0013 292/24 |
| 2007/0290511 A1* | 12/2007 | Liang | E05B 65/0858 292/24 |
| 2008/0258475 A1* | 10/2008 | Chung | E05C 9/1875 292/25 |
| 2009/0230699 A1* | 9/2009 | Carabalona | B60R 7/06 292/48 |
| 2012/0248790 A1* | 10/2012 | Costabel | E05B 63/143 292/96 |
| 2020/0214913 A1* | 7/2020 | Pettigrew | A61G 3/0209 |

FOREIGN PATENT DOCUMENTS

| | | | | |
|---|---|---|---|---|
| CN | 102345420 A | 2/2012 | | |
| EP | 1197621 A1 | 4/2002 | | |
| WO | WO-2009014461 A1 * | 1/2009 | ........... | E05B 15/024 |
| WO | 2010004030 A2 | 1/2010 | | |
| WO | 2016069558 A1 | 5/2016 | | |
| WO | WO-2016069558 A1 * | 5/2016 | ........... | A47B 46/005 |

OTHER PUBLICATIONS

International Preliminary Report on Patentability for International Application No. PCT/US2017/057383, dated Apr. 23, 2019, 12 pages.
Chinese Office Action for Chinese Application No. 201780079453X, dated Jul. 30, 2020 with translation, 11 pages.

* cited by examiner

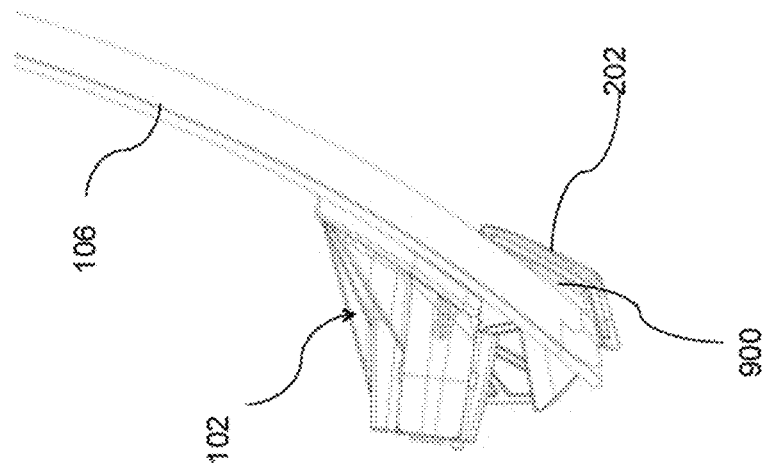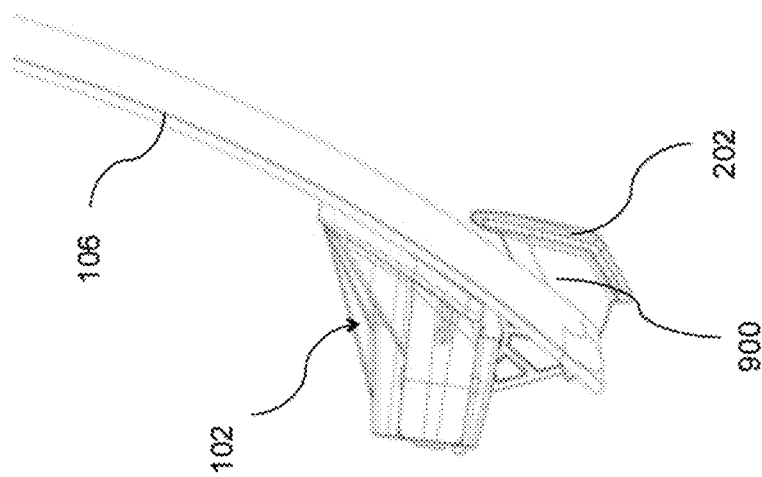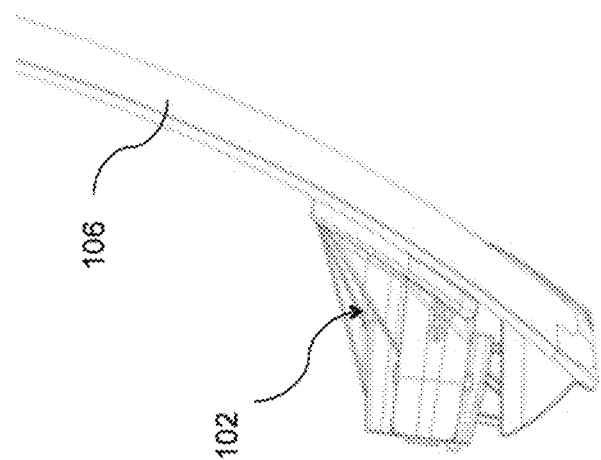

BIN LATCH

This application is a U.S. National Phase application of PCT International Application No. PCT/US2017/057383, filed Oct. 19, 2017, and is related to, and claims the benefit of priority of, U.S. Provisional Application No. 62/411,231, entitled BIN LATCH, filed on 21 Oct. 2016, both of which are incorporated herein by reference in their entireties for all purposes.

FIELD OF THE INVENTION

The present invention relates to the field of latches or connector systems configured to provide a mechanical connection between adjacent components, and particularly to latch systems for securing aircraft storage bin doors in the closed position.

BACKGROUND OF THE INVENTION

Door connector systems, such as aircraft bin door connectors, typically include a latch and a striker that are coupled to a bin door and a bin housing. The bin door is secured in the closed position by engaging the latch to the striker.

There is therefore a need for improved connector systems that will allow the locking and unlocking of aircraft bin doors and other closures in which redundant connections, and independent indicators if not latched, are desired.

SUMMARY OF THE INVENTION

According to a first embodiment of the present invention, there is provided a latch having: a latch housing; a first latching component movably mounted to the latch housing, the first latching component being movable between a respective latched position and a respective unlatched position; a second latching component movably mounted to the latch housing, the second latching component being movable independent of the first latching component between a respective latched position and a respective unlatched position; a handle movably mounted to the latch housing to be movable between an open handle position and a closed handle position; a first trigger movably mounted to the latch housing, the first trigger being movable between a respective engaged position in which the first trigger is positioned to prevent the first latching component from moving from its respective latched position to its respective unlatched position, and a respective disengaged position in which the first trigger is positioned to prevent the handle from moving from the open position to the closed position; and a second trigger movably mounted to the latch housing, the second trigger being movable between a respective engaged position in which the second trigger is positioned to prevent the second latching component from moving from its respective latched position to its respective unlatched position, and a respective disengaged position in which the second trigger is positioned to prevent the handle from moving from the open position to the closed position.

The handle may be pivotally connected to the latch housing. The first and second latching components may comprise pawls rotatably mounted to the latch housing. The handle may be operatively associated with the first and second latching components to prevent them from moving from their respective latched positions to their respective unlatched positions when the handle is in the closed handle position, and allow them to move from their respective latched positions to their respective unlatched positions when the handle is in the open handle position. The handle may be configured to hold the first and second triggers in their engaged positions when the handle is in the closed position, to thereby prevent the first and second latching components from moving to their respective unlatched position. The handle may have first and second retractor surfaces positioned to move the first and second triggers from their engaged positions to their disengaged positions.

The first and second latching components may include springs configured to bias them towards their unlatched positions. The first and second triggers may be located at respective first and second locking points on their movement paths when they are in their engaged positions, to thereby hold the latching components in their latched positions, and not located at the first and second locking points when the triggers are in their respective disengaged positions, to allow the springs to move the latching components to their respective unlatched positions. The first and second latching components may occupy the first and second points when they are in their unlatched positions, to prevent the triggers from moving to their engaged positions. The handle may include first and second contact surfaces to contact the first or second trigger to prevent movement of the handle to the closed handle position.

The first and second triggers may be a respective cams rotatably mounted to the latch housing. The handle may include first and second contact surfaces configured to abut a respective one of the first and second cam when the triggers are in the disengaged position, and not abut the respective cam when the triggers are in the engaged position The latch may include a striker having first and second striker pins configured to engage the first and second pawls when the latching components are in their respective latched positions, and not engage the pawls when the latching component are in their respective unlatched positions. The latch housing is maintained in engagement with the striker while at least one of the first striker pin engages the first pawl or the second striker pin engages the second pawl, and the latch housing is displaceable from the striker when the first latching component and the second latching component are both in their respective unlatched positions.

The handle and latch housing may be configured such that a predetermined surface of the handle is concealed when the handle is in the closed position, and exposed when the handle is not in the closed position.

According to a second embodiment of the invention, there is provided a latch having: a first means for engaging a corresponding first striker component in a latched position; a second means for engaging a corresponding second striker component in a latched position; and means movable between a closed position for resisting disengagement of the first engaging means from the first striker component and disengagement of the second engaging means from the second striker component and an open position for permitting disengagement of the first engaging means from the first striker component and disengagement of the second engaging means from the second striker component, the resisting and permitting means being movable from the open position to the closed position only when the first engaging means is engaged with the first striker component and the second engaging means is engaged with the second striker component, thereby preventing the resisting and permitting means from moving to the closed position when the first engaging means and/or the second engaging means is not in its respective latched position.

According to a third embodiment of the invention, there is provided a latch system having a striker including a first striking portion and a second striking portion, and a latch. The latch includes: a latch housing; a first latching component movably mounted to the latch housing, the first latching component being movable between a respective latched position engaging the first striking portion and a respective unlatched position; a first trigger operatively associated with the first latching component; a second latching component movably mounted to the latch housing, the second latching component being movable independent of the first latching component between a respective latched position engaging the second striking portion and a respective unlatched position; a second trigger operatively associated with the first latching component; and a handle movably mounted to the latch housing and operatively associated with the first latching component via the first trigger and operatively associated with the second latching component via the second trigger, the handle being movable from a closed handle position to an open handle position to permit the first latching component and the second latching component to move together from their respective latched positions to their respective unlatched positions, and the handle being movable from the open handle position to the closed handle position only when the first latching component and the second latching component are both in their respective latched positions and the first trigger and the second trigger are in respective engaged positions, thereby preventing the handle from moving to the closed handle position when the first latching component and/or the second latching component are in their respective unlatched positions.

According to a fourth embodiment of the invention, there is provided a storage system having a frame supporting a striker including a first striking portion and a second striking portion, and a door mounted for movement with respect to the frame between closed and opened conditions. The door supports a latch including: a latch housing; a first latching component movably mounted to the latch housing, the first latching component being movable between a respective latched position engaging the first striking portion and a respective unlatched position; a first trigger operatively associated with the first latching component; a second latching component movably mounted to the latch housing, the second latching component being movable independent of the first latching component between a respective latched position engaging the second striking portion and a respective unlatched position; a second trigger operatively associated with the first latching component; a handle movably mounted to the latch housing and operatively associated with the first latching component via the first trigger and operatively associated with the second latching component via the second trigger, the handle being movable from a closed handle position to an open handle position to permit the first latching component and the second latching component to move together from their respective latched positions to their respective unlatched positions, and the handle being movable from the open handle position to the closed handle position only when the first latching component and the second latching component are both in their respective latched positions and the first trigger and the second trigger are in respective engaged positions, thereby preventing the handle from moving to the closed handle position when the first latching component and/or the second latching component are in their respective unlatched positions. The handle is positioned relative to the door such that the handle extends outwardly farther relative to the door when the handle is not in the closed handle position as compared to when the handle is in the closed position, thereby providing an indicator when the handle is not in the closed position.

BRIEF DESCRIPTION OF THE DRAWINGS

The above and other aspects and features of the present invention will become more apparent to those of ordinary skill in the art by describing in detail exemplary embodiments thereof with reference to the attached drawings, in which:

FIGS. 9A, 9B and 9C are side views of the embodiment of FIG. 1, shown in the latched position, the unlatched position and in a partial latching event, respectively;

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

In some cases, it is desirable to provide a redundant latching mechanism that secures the latch to the striker by multiple connectors. This helps assure closure even if one connector fails. However, in such devices, it may not be readily apparent to the operator when one of the multiple connectors has failed to engage upon securing the keeper to the striker (a "partial latching event"). If a partial latching event is not detected, the redundancy feature of the connector system will be compromised, as the connector system will operate with less than all of the connectors in operation from the outset. In the context of aircraft bin door connector systems, which typically have two connectors, this can lead to luggage stored above passengers' heads being released from the bins prematurely if the lone secured connector fails.

It has also been found that bin latches can be difficult to operate when the bin is deformed under heavy luggage loads, because the relative positions of the latch and the striker can change by a significant distance. This can exacerbate the incidence of partial latching events by making it more difficult to manipulate the latch and the striker into proper alignment to make the connection. Crew acting quickly secure the bins for flight, and passengers unfamiliar with the mechanism, may not detect a partial latching event after struggling to align and secure the latch with the striker.

Referring to the figures generally, a connector system configured for retaining a door in the closed position is provided. The embodiments herein describe the connector system as being used in the context of aircraft bins, but other uses are envisioned and possible.

Figure 1:
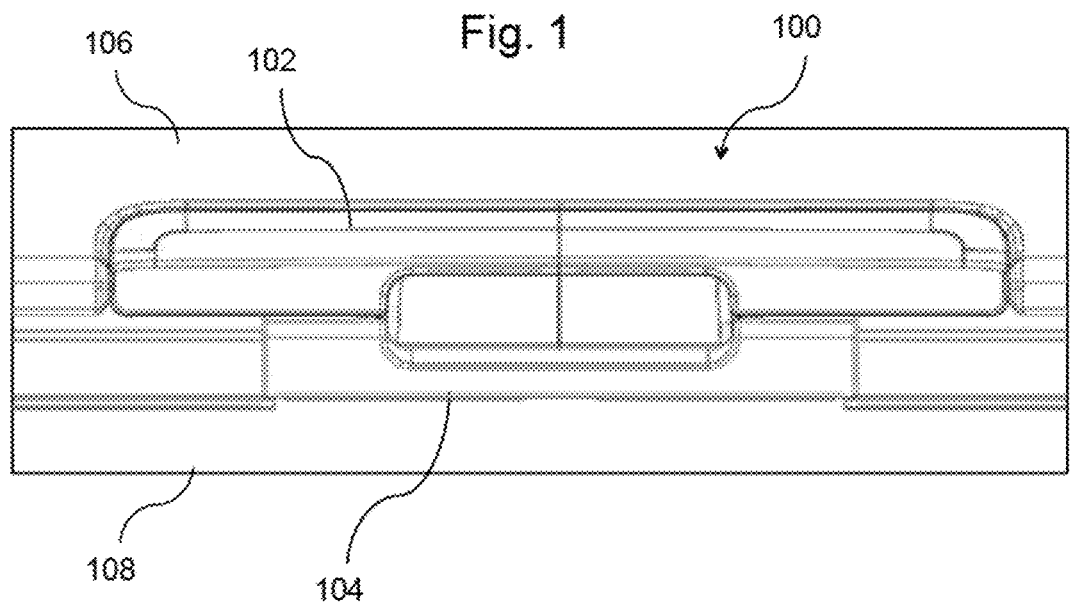
FIG. 1 illustrates a first embodiment of a connector system according to the present invention, shown connected to a bin door and bin housing.

FIG. 1 illustrates a latch or connector system 100 comprising a latch 102 and a striker 104. The latch 102 is connected to an aircraft bin door 106, and the striker 104 is connected to an aircraft bin frame or housing 108. The parts are positioned such that the latch 102 coincides with the striker 104 when the door 106 is moved to close the housing 108. In other embodiments, the positions of the latch 102 and the striker 104 may be transposed. Also, multiple latches 102 and strikers 104 are optionally included in the connector system 100.

Figure 2:
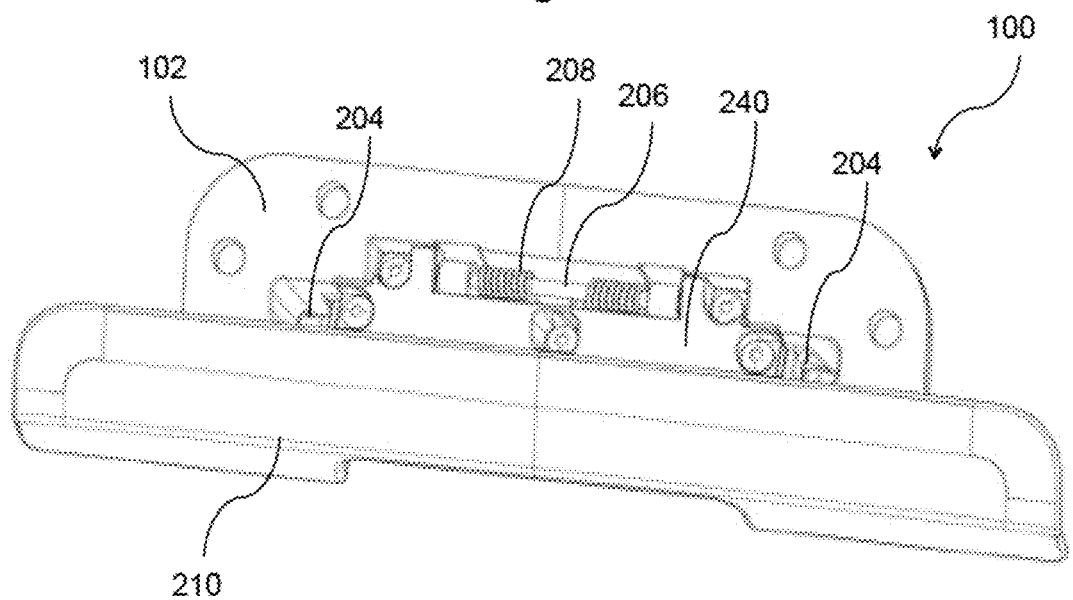
FIG. 2 illustrates the embodiment of FIG. 1 removed from the bin door and bin housing.
Figure 3:
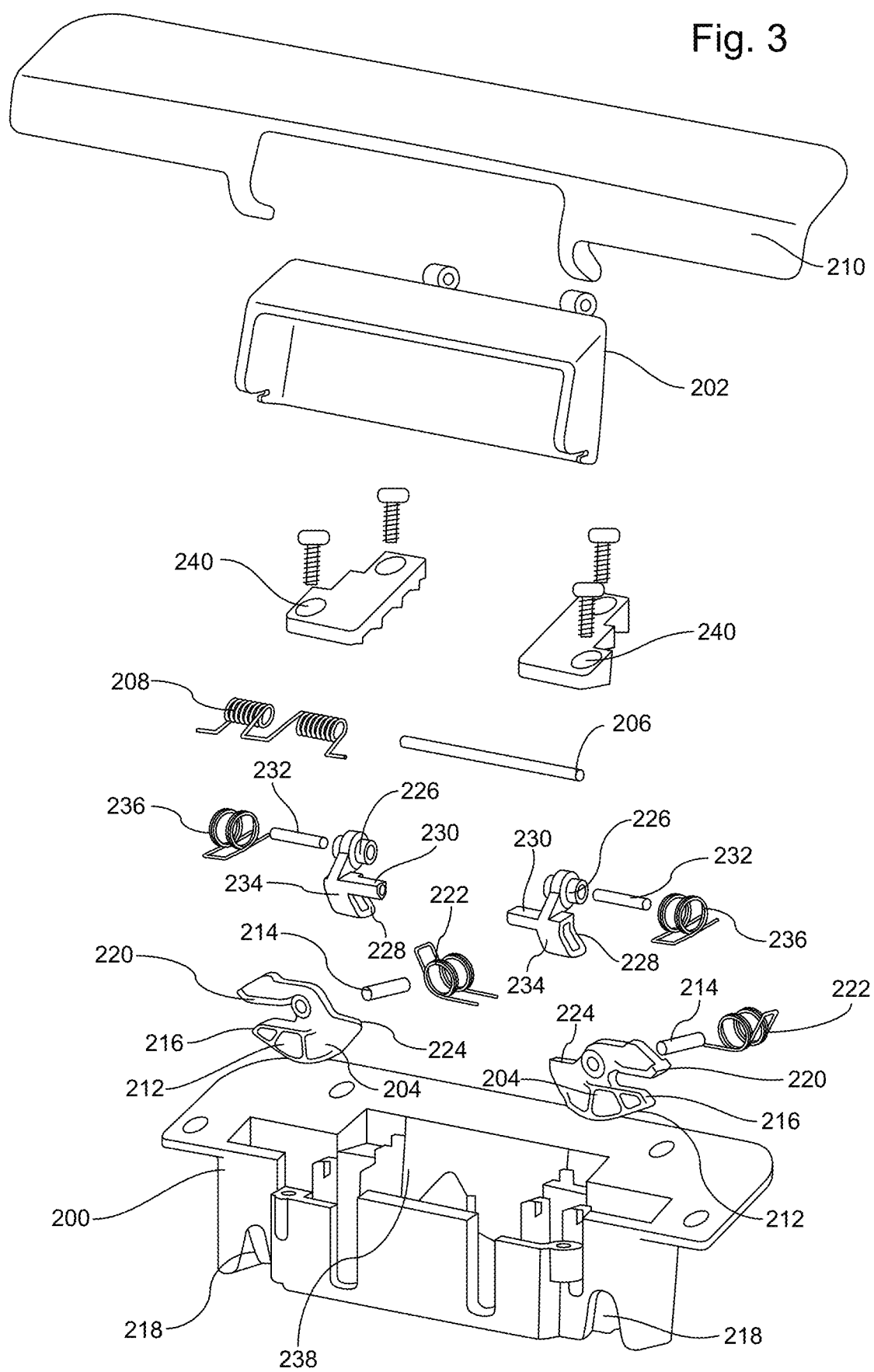
FIG. 3 is an exploded of the latch of FIG. 1.

Referring to FIGS. 2 and 3, the latch 102 is described in detail. The latch 102 includes a latch housing 200, a paddle or handle 202, and two or more latching components in the form of connectors 204. In general terms, the handle 202 is operated to disengage the connectors 204 to release the latch 102 from the striker 104.

The handle 202 is movably attached to the latch housing 200 via a handle pivot pin 206. In this embodiment, the pivot pin 206 is a separate steel pin that fits within corresponding bosses on the handle 202 and the latch housing 200, but other embodiments may use a pivot pin that is integrally formed with one of the parts, or other pivot configurations, as known in the art. In other embodiments, other movable connectors may be used to movably connect the handle 202, such as rails or guide pins to provide a linear or arcuate sliding connection, multi-bar linkages to provide complex movement paths, and so on.

The handle 202 is movable relative to the housing 200 through a predetermined range of movement that includes a fully closed position and a fully open position. As explained in more detail below, the handle 202 also may have one or more discrete partial latching event positions located between the fully open position and the fully closed position, or the fully open position may serve as the partial latching event position. One or more handle return springs 208 may be provided to bias the handle 202 towards the fully closed position. In this embodiment, the handle return spring 208 is a torsion spring mounted around the handle pivot pin 206, but other resilient devices may be used in other embodiments.

Figure 10:
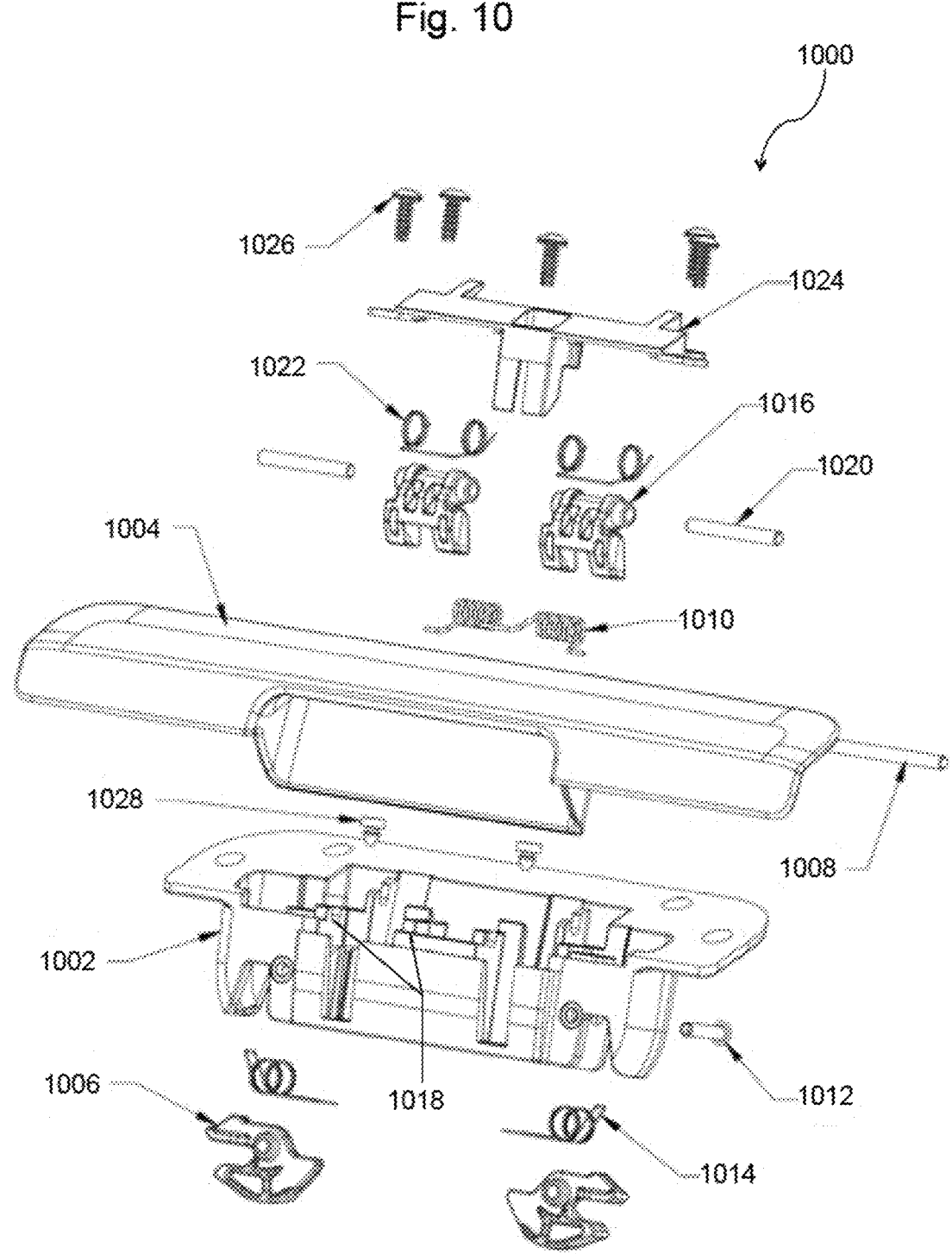
FIG. 10 is an exploded view of a second embodiment of a connector latch.

The handle 202 is shaped to receive a user's fingers or hand, and may include a functional or cosmetic cover 210 or other features. Handle 202 and cover 210 may also be integrated together as shown in FIG. 10. The handle 202 also may be operatively connected (e.g., by cable or linkage) to a remote actuator to allow operation of the latch 102 from a remote location. Other alternatives will be apparent to persons of ordinary skill in the art in view of the present disclosure.

Figure 4A:
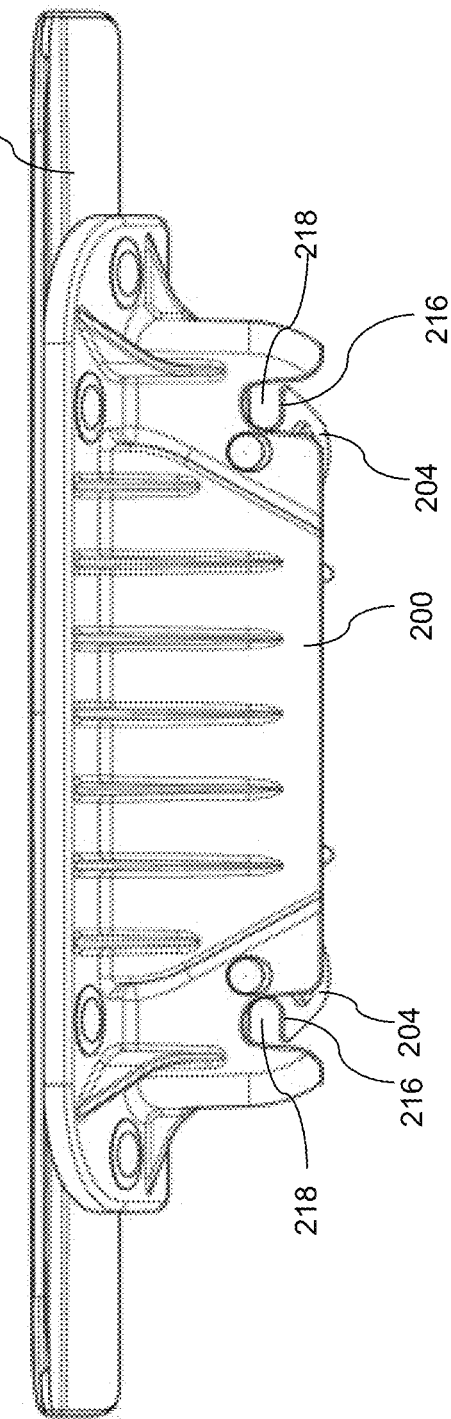
FIGS. 4A and 4B illustrate the latch of FIG. 1 shown in the latched and unlatched positions, respectively.
Figure 4B:
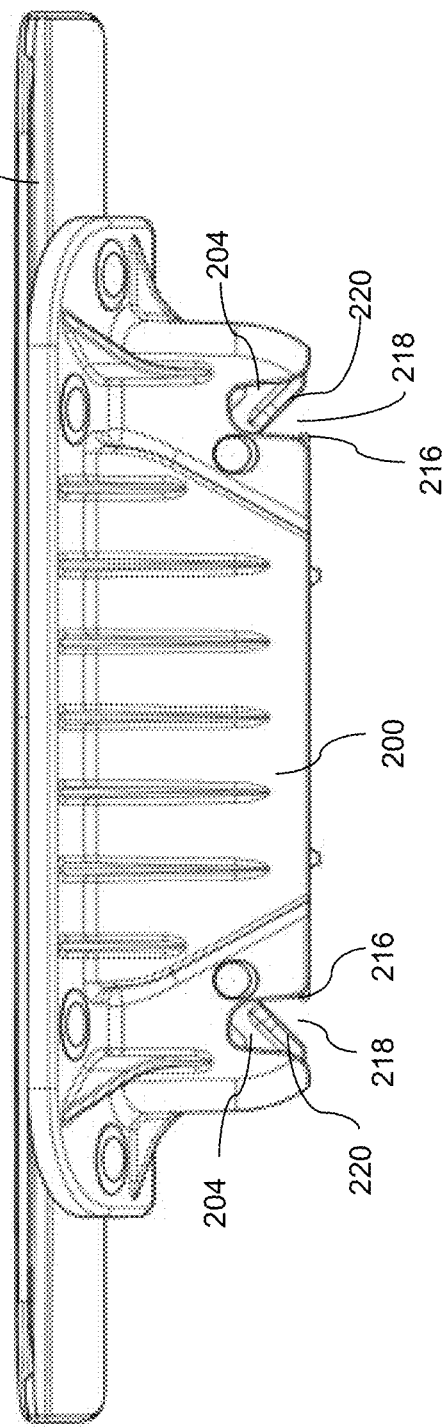

Each connector 204 preferably comprises a pawl 212 that is pivotally connected to the latch housing 200 by a connector pivot pin 214 or the like. Referring also to FIGS. 4A and 4B, each connector 204 is movable between a latched position (FIG. 4A) and an unlatched position (FIG. 4B). The exemplary pawls 212 are formed as channels having a retaining surface 216 configured to hold corresponding striker pins 502 (see FIG. 5) when the pawls 212 are in the latched position. This engagement prevents the striker 104 from moving away from the latch 102. The retaining surfaces 216 may cooperate with respective notches 218 in the latch housing 200 to form an enclosed space to retain each striker pin 502 against movement in two directions. In the unlatched position, such as shown in FIG. 4B, the pawls 212 are rotated such that the retaining surfaces 216 no longer capture the striker pins 502, to allow the striker 104 to move away from latch 102.

Each pawl 212 also may have an activation surface 220 facing the respective retaining surface 216, and a connector return spring 222 that biases the pawl 212 to the unlatched position. The connector return springs 222 ensure that the pawls 212 remain in the unlatched position after the latch 102 is disconnected from the striker 104. The activation surface 220 is positioned to contact the striker pin 502 as the latch 102 is moved towards the striker 104. Upon continued movement of the latch 102 towards the striker 104, the striker pins 502 rotate the connectors 204 against the bias of the connector return springs 222 to place the pawls 212 in the latched connector position.

Once the connectors 204 are in the latched position, such as shown in FIG. 4A, they may be latched into place so that the connector return springs 222 do not open the latch 102 when the operator releases the handle 202 or stops pressing the latch 102 towards the striker 104. To this end, each connector 204 includes a lock surface 224 that is engaged by a mechanism to prevent the connector 204 from rotating from the latched position to the unlatched position. More specifically, when the handle 202 is in the closed position, the mechanism is positioned at a locking point along which the lock surface 224 must travel when the connector 204 moves to the unlatched position. The mechanism may comprise one or more protrusions extending from the handle 202, which protrusion(s) occupies this locking point for each connector 204 when the handle 202 is in the closed position. More preferably, however, the mechanism comprises a respective separate trigger 226 for each connector 204.

Figure 7A:
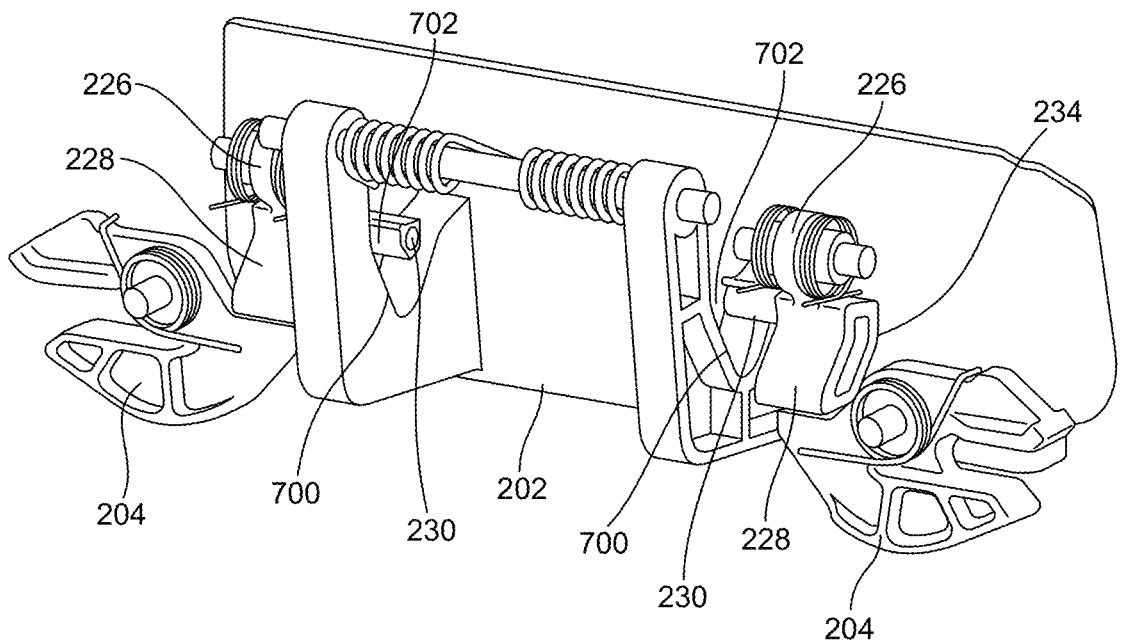
FIG. 7A illustrates the latch of FIG. 1 in the latched position, with the latch housing removed for clarity.
Figure 7B:
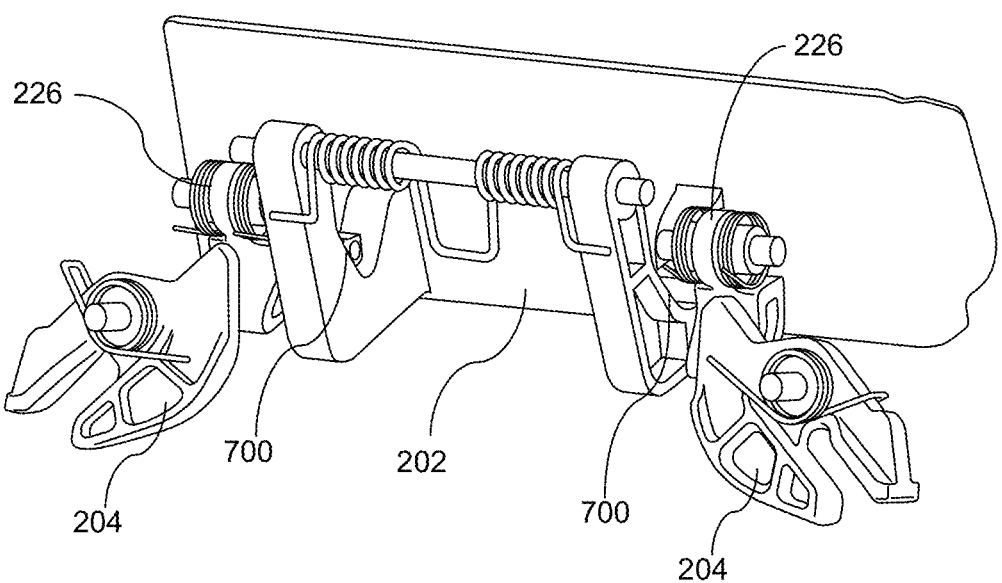
FIG. 7B illustrates the latch of FIG. 1 in the unlatched position, with the latch housing removed for clarity.

Each trigger 226 includes a first lock portion 228 and a second lock portion 230. The first and second lock portions 228, 230 are connected to rotate together about a common trigger pivot pin 232. As best shown in FIGS. 7A and 7B, the triggers 226 are movable between an engaged position (FIG. 7A) in which the first lock portion 228 occupies the locking point for its respective connector 204, and a disengaged position in which the first lock portion 228 does not occupy the locking point. The triggers 226 are moved from the engaged position to the disengaged position by contact between the respective second lock portion 230 and a respective corresponding retraction surface 700 provided on the handle 202. More specifically, as the handle 202 is moved relative to the latch housing 200, the retraction surfaces 700 contact the second lock portions 230, and further movement of the handle 202 forces the triggers 226 to rotate about the trigger pivot pins 232. When the triggers 226 reach their disengaged positions, the connectors 204 are free to move from their latched positions to their unlatched positions under the biasing force provided by the connector springs 222.

Figure 7C:
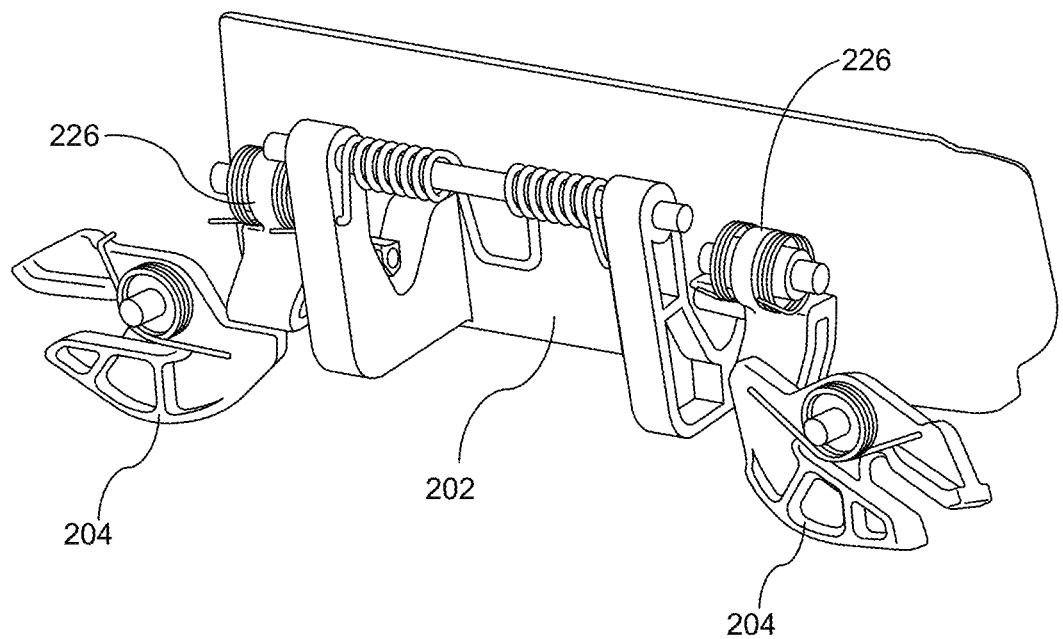
FIG. 7C illustrates the latch of FIG. 1 in a partial latching event, with the latch housing removed for clarity.
Figure 8:
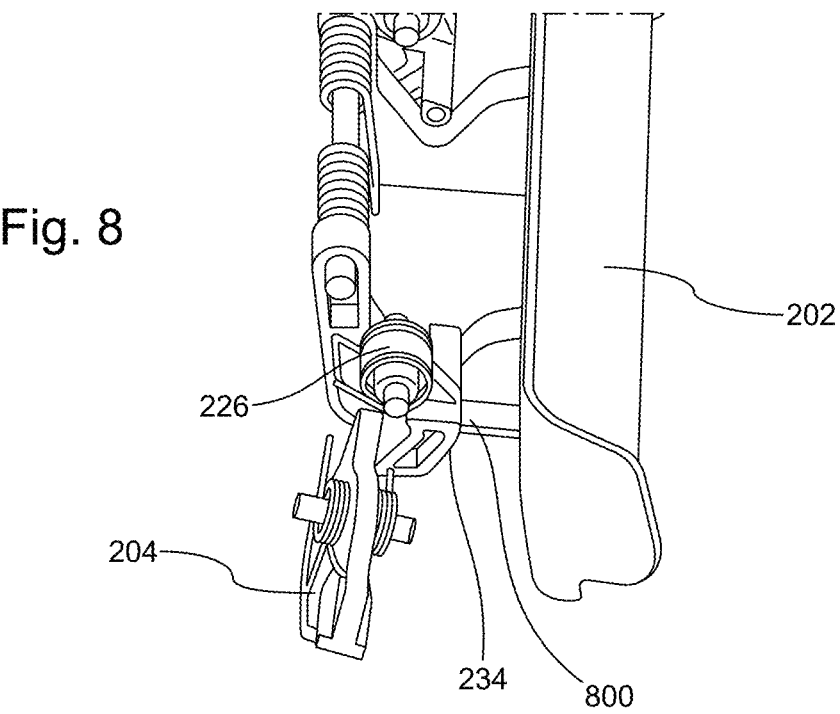
FIG. 8 shows an alternative view of the latch of FIG. 1 in a partial latching event, with the latch housing removed for clarity.

Once the connectors 204 rotate out of their latched positions, a portion of each connector 204 occupies the connector's respective locking point. Thus, the first lock portions 228 are prevented from returning to the connector's locking points by interference with the connectors 204, and the triggers 226 are unable to return from their disengaged positions to their engaged positions. While each trigger 226 is in its disengaged position, it forms a separate obstruction that prevents the handle 202 from returning to the closed handle position. The triggers 226 operate independently, so the handle 202 will remain in the partial latching position even if one of the connectors 204 returns to the latched position, such as shown in FIGS. 7C and 8. This provides a visual indication that one or both of the connectors 204 are in the unlatched position, as explained in more detail below. The handle 202 will return to the closed position only when both connectors 204 return to their latched positions and both triggers 226 return to their engaged positions.

The activation properties of the triggers 226 can be adjusted by modifying the locations and shapes of the first and second lock portions 228, 230. For example, each first lock portion 228 may be formed with a cam surface 234 that abuts a corresponding contact surface 800 (FIG. 8) on a portion of the handle 202 when the trigger 226 is in the disengaged position. The shape and size of the cam surface 234 can dictate the exact position of the handle's partial latching position. Thus, while it may require only a small movement to displace the trigger 226 from the disengaged position to the engaged position, the handle 202 may require a significantly large movement to return from the partial latching position to the closed position. This helps provide a more pronounced indication that the latch 102 is not fully engaged with the striker 104.

As another example, a gap 702 may be provided between the second lock portion 230 and the handle's retraction surface 700 when the handle 202 is in the closed position and the triggers 226 are in the engaged position, such as shown in FIG. 7A. This gap 702 provides some degree of free movement of the handle 202 before it begins disengaging the connectors 204, to help prevent inadvertent release. This configuration also may provide an open space for the second lock surface 230 to enter to allow one trigger 226 to return to the engaged position to secure one of the connectors 204, even if the handle 202 remains in the partial locking position, as best shown in FIG. 7C.

The triggers 226 are returned to their engaged positions by the process of engaging the latch 102 to the striker 104. As noted above, the striker pins 502 drive the connectors 204 from their unlatched positions back to their latched positions, at which point the connectors 204 no longer occupy their respective locking points. Thus positioned, the first lock portions 228 are free to rotate back to occupy the locking points for their respective connectors 204, to thus place the triggers 226 in the engaged position. The triggers 226 may be moved to the engaged position by interaction with the handle 202, but more preferably one or more trigger return springs 236 are provided to bias the triggers 226 towards their engaged positions. In this case, the trigger return springs 236 are helical springs surrounding the trigger pivot pins 232.

It will be appreciated that other embodiments may use triggers having different structures and movement paths. For example, the triggers 226 may be sliders, or the trigger return springs 236 may be leaf springs, living hinges, or the like. As another example, briefly noted above, the triggers may simply be protrusions formed on the handle 202. During a partial latching event with this embodiment, one protrusion may be prevented from returning to the engaged position by an unlatched connector to thereby hold the handle in the partial latching position. When this happens, the handle may be too rigid to allow the other protrusion to engage the other connector, even if it is in the latched position. Thus, in this embodiment the handle may be formed with some flexibility or slack in the handle pivot pin to allow the other protrusion to move to the engaged position to secure the connector that has managed to obtain the latched position. Other alternatives will be apparent to persons of ordinary skill in the art in view of the present disclosure.

Referring back to FIG. 3, the various parts of the latch 102 may be secured in a cavity 238 of the latch housing 200 by one or more covers 240. For example, the cavity 238 and the covers 240 may include corresponding mounting bosses that hold the handle pivot pin 206, connector pivot pins 214 and trigger pivot pins 232. The various parts may be made of any suitable materials, but lightweight metals, plastics and composites are preferred for aircraft applications. The latch may be secured to the bin door 106 by any suitable arrangement of connectors, adhesives, or the like. Other alternatives will be apparent to persons of ordinary skill in the art in view of the present disclosure.

Figure 5:
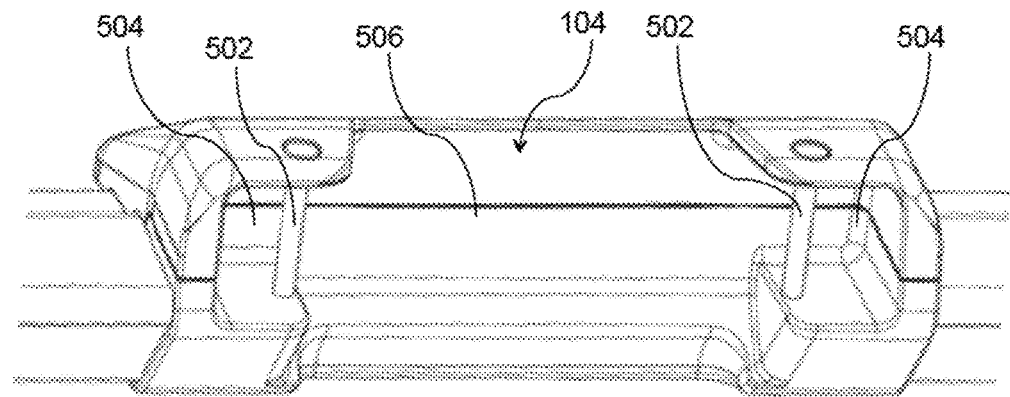
FIG. 5 is a first view of the striker of FIG. 1, shown attached to the bin housing.
Figure 6:
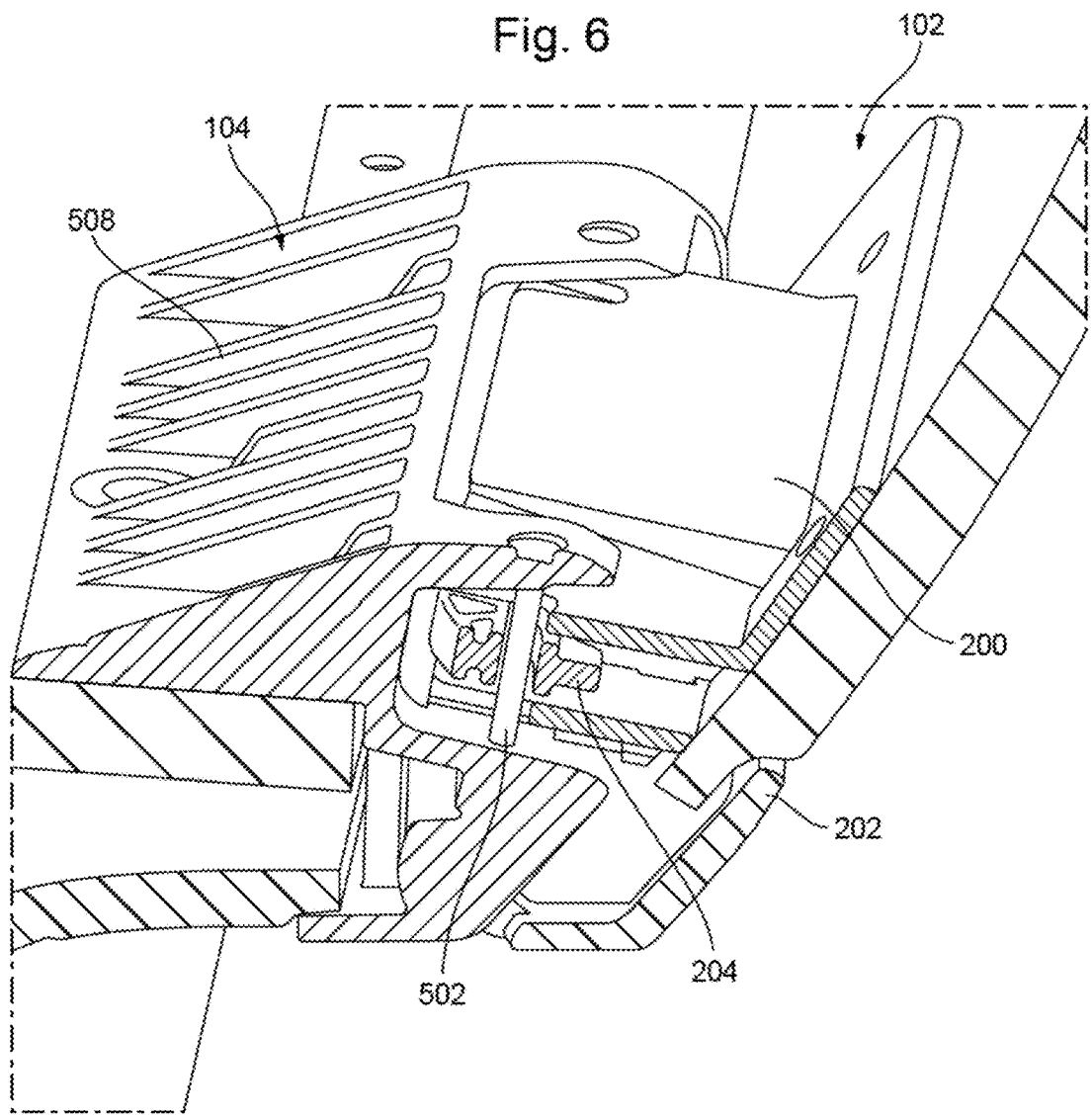
FIG. 6 is a cutaway view of the striker of FIG. 1, shown attached to the bin housing.

An exemplary striker 104 is illustrated in detail in FIGS. 5 and 6. The striker 104 includes two striker portions or pins 502, which are oriented parallel to one another and spaced apart by a suitable distance to engage the connectors 204. It has been found that the bin housing 108 can move vertically depending on the weight of the luggage stored in the bin and loads experienced during aircraft travel. The striker pins 502 preferably are elongated in the vertical direction so that a portion of each striker pin 502 will be properly located to engage with the connectors 204 regardless of the bin housing's movement. Each striker pin 502 may be provided in a respective latch cavity 504. The striker 104 also may include a cavity 506 to receive a user's fingers or hand to access the handle 202. The back of the striker 104 may include a sloping surface 508 to integrate smoothly with the bin's interior and thereby help prevent the possibility that luggage or the like will be caught on the striker 104. The striker 104 may be made of any suitable material, and joined to the bin housing 108 in any suitable way, but lightweight materials are generally preferred for use in aircraft.

FIGS. 9A-9C illustrate the operation of the handle 202. In FIG. 9A, the latch is properly secured to the striker, and the handle 202 is in the closed position. In FIG. 9B, the handle 202 is moved to the open position to release the latch from the striker. In FIG. 9C, the handle is in the partial latching position, indicating that one or both of the connectors 204 has failed to move to the latched position. The precise location of the partial latching position may be modified by adjusting the interacting structures of the handle 202, connectors 204 and triggers 226, or by making other modifications as will be understood by those of ordinary skill in the art in view of this disclosure.

The appearance of the partial locking position also may be accentuated by providing the portion 900 of the handle that is exposed while in the partial locking position with a distinctive color, such as red, "blaze orange," yellow and so on. By providing an indicator, such as portion 900, or an indicator light, such as an LED, on portion 900, a user of the latch or connector system 100 can determine whether or not the connector system 100 is in the closed condition. For example, when the latch 102 is connected to an aircraft bin door 106, and the striker 104 is connected to an aircraft bin frame or housing 108, a flight attendant or passenger can identify any bin doors that are not fully closed. More specifically, an individual visualizing the bin door in a direction generally along the surface of the bin door (such as by looking down an isle of an aircraft) or from a direction that is not normal to the bin door would see the portion 900 of the handle when the bin door 106 is not fully closed.

FIG. 10 illustrates another embodiment of a connector latch 1000. This embodiment provides various exemplary variations of the embodiment discussed above. The latch 1000 includes a latch housing 1002, a paddle or handle 1004, and two or more latching components, in the form of connectors 1006, that are configured to engage striker pins on a striker (not shown), as explained with reference to the previous embodiment. As with the embodiment discussed above, the connectors 1006 are pivotally mounted to the latch housing 1002 by connector pivot pins 1012 or the like.

The handle 1004 is movably attached to the latch housing 1002 via a handle pivot pin 1008, to move between a closed position and an open position. The handle 1008 also may have one or more discrete partial latching event positions located between the open position and the closed position. A handle return spring 1010 biases the handle 1008 towards the closed position.

A trigger 1016 is provided for each connector 1006. The triggers are similar to the previous embodiment, but in this example, each trigger 1016 is mounted between a pair of respective mounting bosses 1018 by a respective trigger pivot pin 1020 in a double-shear configuration that is expected to enhance the stability of the parts. Each trigger 1016 moves between a respective engaged position and a respective disengaged position, as described above. A trigger return spring 1022 is provided to bias each trigger 1016 towards the engaged position.

The various parts of the latch 1000 may be retained in place by one or more covers 1024, and secured by one or more screws 1026 or other fasteners. The latch 1000 also may include bumpers 1028 to provide a more gentle return of the handle 1004 to the closed position, a key lock to prevent the latch 1000 from being opened, and other features common to latch mechanisms.

The embodiment of FIG. 10 operates in essentially the same manner as the previous embodiment, and may include the same array of features and modifications. Thus, it is not necessary to describe all of the features and operations of the various parts in more detail here.

Figure 11:
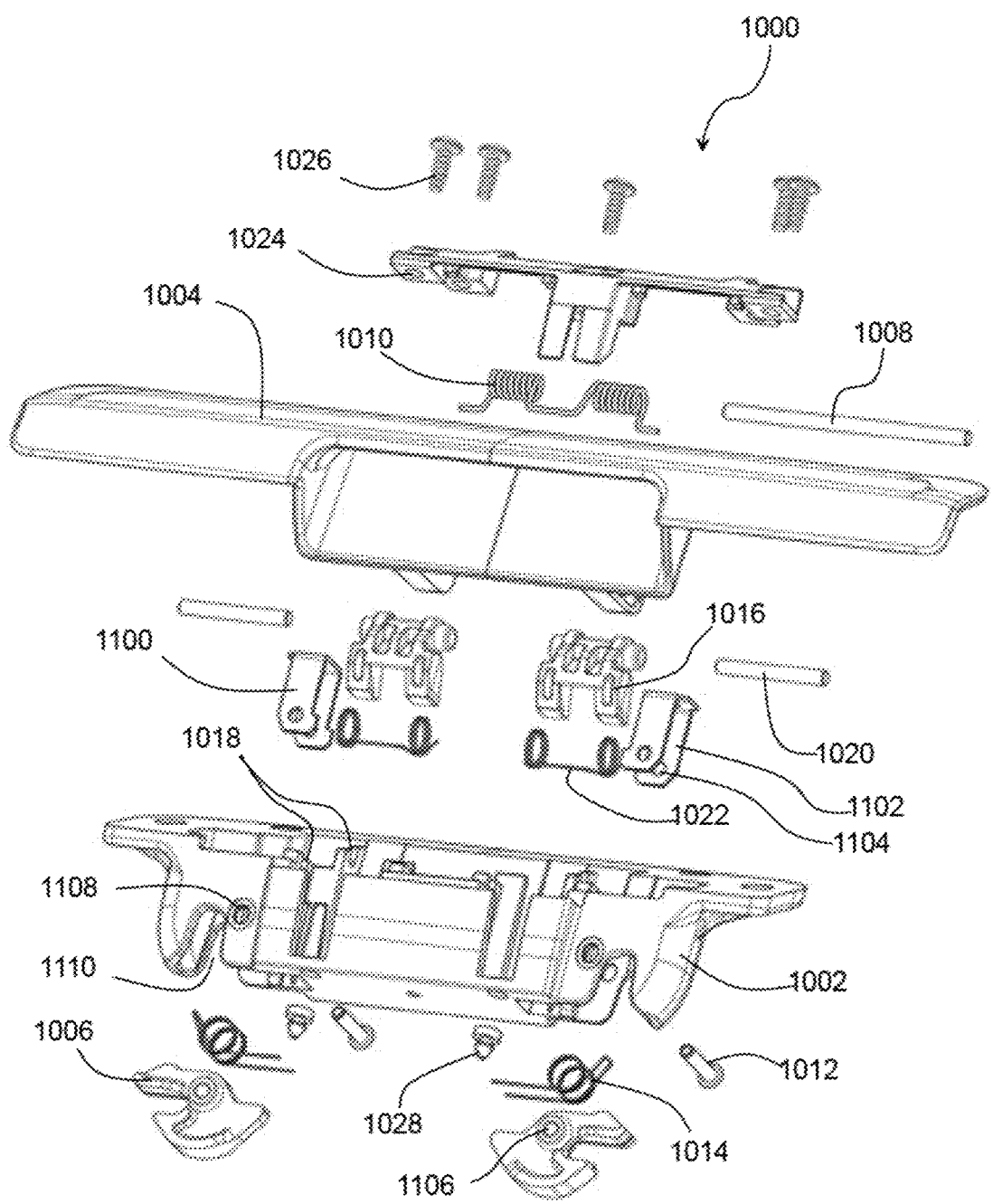
FIG. 11 is an exploded view of another embodiment of a connector latch.

FIG. 11 illustrates a variation on the embodiment of FIG. 10. This embodiment is generally the same as the embodiment or FIG. 10, except with respect to the manner in which the connectors 1006 are attached to the latch housing 1002. In this exemplary embodiment, the connectors 1006 are pivotally connected to the latch housing 1002 by mounting brackets 1100. Each mounting bracket 1100 has arms 1102 that surround each connector 1006, and each arm 1102 has a hole 1104 that aligns with a corresponding hole 1106 through the connector 1006. The connector pivot pins 1012 pass through the arms holes 1104 and the connector hole 1106 to pivotally connect the connectors 1006 to the mounting brackets 1100 in a double-shear arrangement. The mounting brackets 1100 may be secured to the latch housing 1002 by screws 1026 (which also may pass through the cover 1024) or otherwise clamped or held in place. The mounting brackets 1102 can provide increased load bearing capacity by relieving concentrated forces that might exist between the latch housing 1002 and the connector pivot pins 1012 under high loading conditions. To this end, the brackets may comprise a relatively high-strength material as compared to the latch housing 1002, such as steel as compared to plastic or aluminum. In this embodiment, the connector pivot pins 1012 also may pass through the latch housing 1002, but the latch housing holes 1108 may be oblong or oversized to prevent or reduce the generation of high contact forces between the connector pivot pins 1012 and the latch housing 1002. Alternatively, the latch housing holes 1108 may be eliminated, such as by increasing the size of the notch 1110 that receives the functional surfaces of the connectors 1006 to encompass the region surrounding the ends of the connector pivot pins 1012.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A latch comprising:
   a latch housing;
   a first latching component movably mounted to the latch housing, the first latching component being movable between a respective latched position and a respective unlatched position;
   a second latching component movably mounted to the latch housing, the second latching component being movable independent of the first latching component between a respective latched position and a respective unlatched position;
   a handle movably mounted to the latch housing to be movable between an open handle position and a closed handle position;
   a first trigger movably mounted to the latch housing separately from the first latching component, the first trigger being movable between a respective engaged position in which the first trigger is positioned to prevent the first latching component from moving from its respective latched position to its respective unlatched position, and a respective disengaged position in which the first trigger is positioned to prevent the handle from moving from the open position to the closed position; and
   a second trigger movably mounted to the latch housing separately from the second latching component, the second trigger being movable between a respective engaged position in which the second trigger is positioned to prevent the second latching component from moving from its respective latched position to its respective unlatched position, and a respective disengaged position in which the second trigger is positioned to prevent the handle from moving from the open position to the closed position
   wherein the handle comprises:
      a first contact surface positioned to directly contact the first trigger when the first trigger is in its respective disengaged position to thereby prevent movement of the handle to the closed handle position; and
      a second contact surface positioned to directly contact the second trigger when the second trigger is in its respective disengaged position to thereby prevent movement of the handle to the closed handle position.

2. The latch of claim 1, wherein the handle is pivotally connected to the latch housing.

3. The latch of claim 1, wherein the first latching component comprises a first pawl rotatably mounted to the latch housing and the second latching component comprises a second pawl rotatably mounted to the latch housing.

4. The latch of claim 1, wherein the handle is operatively associated with the first latching component and the second latching component to prevent the first latching component and the second latching component from moving from their respective latched positions to their respective unlatched positions when the handle is in the closed handle position, and allow the first latching component and the second latching component to move from their respective latched positions to their respective unlatched positions when the handle is in the open handle position.

5. The latch of claim 4, wherein:
the handle is configured to hold the first trigger in its respective engaged position when the handle is in the closed position, to thereby prevent the first latching component from moving from its respective latched position to its respective unlatched position; and
the handle is configured to hold the second trigger in its respective engaged position when the handle is in the closed position, to thereby prevent the second latching component from moving from its respective latched position to its respective unlatched position.

6. The latch of claim 5, wherein the handle comprises:
a first retractor surface positioned to move the first trigger from its respective engaged position to its respective disengaged position when the handle is moved from the closed handle position to the open handle position; and
a second retractor surface positioned to move the second trigger from its respective engaged position to its respective disengaged position when the handle is moved from the closed handle position to the open handle position.

7. The latch of claim 1, wherein:
the first latching component comprises a first spring configured to bias the first latching component towards its respective unlatched position;
the first trigger is located at a first locking point on a movement path of the first latching component when the first trigger is in its respective engaged position, to thereby hold the first latching component in its respective latched position, and the trigger is not located at the first locking point when the first trigger is in its respective disengaged position, to thereby to allow the first spring to move the first latching component to its respective unlatched position;
the second latching component comprises a second spring configured to bias the second latching component towards its respective unlatched position; and
the second trigger is located at a second locking point on a movement path of the second latching component when the second trigger is in its respective engaged position, to thereby hold the second latching component in its respective latched position, and the trigger is not located at the second locking point when the second trigger is in its respective disengaged position, to thereby to allow the second spring to move the second latching component to its respective unlatched position.

8. The latch of claim 7, wherein:
the first latching component occupies the first locking point when the first latching component is in its respective unlatched position to prevent the first trigger from moving from its respective disengaged position to its respective engaged position; and
the second latching component occupies the second locking point when the second latching component is in its respective unlatched position to prevent the second trigger from moving from its respective disengaged position to its respective engaged position.

9. The latch of claim 1, wherein the first trigger comprises a first cam rotatably mounted to the latch housing and the second trigger comprises a second cam rotatably mounted to the latch housing.

10. The latch of claim 9, wherein handle comprises:
a first contact surface configured to abut the first cam when the first trigger is in the disengaged position, and not abut the first cam when the first trigger in in the engaged position; and
a second contact surface configured to abut the second cam when the second trigger is in the disengaged position, and not abut the second cam when the second trigger in in the engaged position.

11. The latch of claim 3, further comprising a striker comprising:
a first striker pin configured to engage the first pawl when the first latching component is in its respective latched position, and not engage the first pawl when the first latching component is in its respective unlatched position; and
a second striker pin configured to engage the second pawl when the second latching component is in its respective latched position, and not engage the second pawl when the second latching component is in its respective unlatched position;
wherein the latch housing is maintained in engagement with the striker while at least one of the first striker pin engages the first pawl or the second striker pin engages the second pawl, and the latch housing is displaceable from the striker when the first latching component and the second latching component are both in their respective unlatched positions.

12. The latch of claim 1, wherein the handle and latch housing are configured such that a predetermined surface of the handle is concealed when the handle is in the closed position, and exposed when the handle is not in the closed position.

13. A latch system comprising:
a striker including a first striking portion and a second striking portion; and
a latch including:
a latch housing;
a first latching component movably mounted to the latch housing, the first latching component being movable between a respective latched position engaging the first striking portion and a respective unlatched position;
a first trigger movably mounted to the latch housing separately from the first latching component and operatively associated with the first latching component;
a second latching component movably mounted to the latch housing, the second latching component being movable independent of the first latching component between a respective latched position engaging the second striking portion and a respective unlatched position;
a second trigger movably mounted to the latch housing separately from the second latching component and operatively associated with the second latching component; and
a handle movably mounted to the latch housing and operatively associated with the first latching component via the first trigger and operatively associated with the second latching component via the second trigger, the handle being movable from a closed handle position to an open handle position to directly contact and move the first trigger and the second trigger to respective disengaged positions to thereby permit the first latching component and the second latching component to move together from their respective latched positions to their respective unlatched positions, and the handle being movable from the open handle position to the closed handle position only when the first latching component and the second latching component are both in their respective latched positions and the first trigger and the second trigger are in respective engaged positions, thereby preventing the handle from moving to the closed handle position when the first latching component and/or the second latching component are in their respective unlatched positions.

14. A storage system comprising:
a frame supporting a striker including a first striking portion and a second striking portion; and
a door mounted for movement with respect to the frame between closed and opened conditions, the door supporting a latch including:
a latch housing;
a first latching component movably mounted to the latch housing, the first latching component being movable between a respective latched position engaging the first striking portion and a respective unlatched position;
a first trigger movably mounted to the latch housing separately from the first latching component and operatively associated with the first latching component;
a second latching component movably mounted to the latch housing, the second latching component being movable independent of the first latching component between a respective latched position engaging the second striking portion and a respective unlatched position;
a second trigger movably mounted to the latch housing separately from the second latching component and operatively associated with the second latching component; and
a handle movably mounted to the latch housing and operatively associated with the first latching component via the first trigger and operatively associated with the second latching component via the second trigger, the handle being movable from a closed handle position to an open handle position to directly contact and move the first trigger and the second trigger to respective disengaged positions to thereby permit the first latching component and the second latching component to move together from their respective latched positions to their respective unlatched positions, and the handle being movable from the open handle position to the closed handle position only when the first latching component and the second latching component are both in their respective latched positions and the first trigger and the second trigger are in respective engaged positions, thereby preventing the handle from moving to the closed handle position when the first latching component and/or the second latching component are in their respective unlatched positions;
the handle being positioned relative to the door such that the handle extends outwardly farther relative to the door when the handle is not in the closed handle position as compared to when the handle is in the closed position, thereby providing an indicator when the handle is not in the closed position.

\* \* \* \* \*